(12) United States Patent
Chaurasia et al.

(10) Patent No.: US 11,902,725 B2
(45) Date of Patent: Feb. 13, 2024

(54) METHODS, SYSTEMS, AND COMPUTER READABLE MEDIA FOR LOAD SHARING CLASS 1 SIGNALING CONNECTION CONTROL PART (SCCP) MESSAGES

(71) Applicant: Oracle International Corporation, Redwood Shores, CA (US)

(72) Inventors: Rajeev Chaurasia, New Delhi (IN); Vipin Kumar, Bangalore (IN); Abhilash Valappil Kunnummal, Apex, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 622 days.

(21) Appl. No.: 17/095,400

(22) Filed: Nov. 11, 2020

(65) Prior Publication Data

US 2022/0150605 A1    May 12, 2022

(51) Int. Cl.
  *H04M 3/00* (2006.01)
  *H04Q 3/00* (2006.01)
  *H04W 8/12* (2009.01)

(52) U.S. Cl.
  CPC ......... *H04Q 3/0025* (2013.01); *H04Q 3/0029* (2013.01); *H04W 8/12* (2013.01); *H04Q 2213/13176* (2013.01)

(58) Field of Classification Search
  CPC ..... H04Q 3/0025; H04Q 3/0029; H04W 8/12; H04L 12/66
  See application file for complete search history.

(56) References Cited

U.S. PATENT DOCUMENTS

| 4,752,924 A | 6/1988 | Darnell et al. |
| 5,008,929 A | 4/1991 | Olsen et al. |
| 5,384,840 A | 1/1995 | Blatchford et al. |
| 5,481,673 A | 1/1996 | Michelson |

(Continued)

FOREIGN PATENT DOCUMENTS

| EP | 0 912 068 A2 | 4/1999 |
| EP | 1 111 940 A1 | 6/2001 |

(Continued)

OTHER PUBLICATIONS

"Database Administration—GTT User's Guide," Oracle Communications EAGLE, E63573 Revision 1, pp. 1-942 (Jul. 2015).

(Continued)

*Primary Examiner* — Rasha S Al Aubaidi
(74) *Attorney, Agent, or Firm* — Jenkins, Taylor & Hunt, P.A.

(57) ABSTRACT

A method for load sharing class 1 SCCP messages includes receiving a class 1 SCCP message requiring global title translation (GTT). The method includes performing GTT for the message to select a load sharing group for the message. The method further includes generating a message signal unit (MSU) load sharing key using parameters from a combination of message transfer part (MTP) layer parameters and signaling connection control part (SCCP) layer parameters. The method further includes using the MSU load sharing key to select a destination address from the load sharing group for the message. The method further includes inserting the destination address into the message. The method further includes routing the message to a destination corresponding to the destination address.

18 Claims, 9 Drawing Sheets

(56) References Cited

U.S. PATENT DOCUMENTS

| | | | |
|---|---|---|---|
| 5,550,914 | A | 8/1996 | Clarke et al. |
| 5,592,477 | A | 1/1997 | Farris et al. |
| 5,592,530 | A | 1/1997 | Brockman et al. |
| 5,708,702 | A | 1/1998 | De Paul et al. |
| 5,740,234 | A | 4/1998 | Black et al. |
| 5,898,667 | A | 4/1999 | Longfield et al. |
| 6,018,515 | A | 1/2000 | Sorber |
| 6,119,000 | A | 9/2000 | Stephenson |
| 6,175,574 | B1 | 1/2001 | Lewis |
| 6,226,289 | B1 | 5/2001 | Williams et al. |
| 6,282,191 | B1 | 8/2001 | Cumberton et al. |
| 6,324,279 | B1 | 11/2001 | Kalmanek, Jr. et al. |
| 6,327,267 | B1 | 12/2001 | Valentine et al. |
| 6,327,270 | B1 | 12/2001 | Christie et al. |
| 6,377,674 | B1 | 4/2002 | Chong et al. |
| 6,535,746 | B1 | 3/2003 | Yu et al. |
| 6,577,723 | B1 | 6/2003 | Mooney |
| 6,628,672 | B1 | 9/2003 | Cabello |
| 6,662,017 | B2 | 12/2003 | McCann et al. |
| 6,683,881 | B1 | 1/2004 | Mijares et al. |
| 6,757,538 | B1 | 6/2004 | Howe |
| 6,785,378 | B2 | 8/2004 | Mar |
| 6,792,100 | B2 | 9/2004 | Nekrasovskaia et al. |
| 6,795,546 | B2 | 9/2004 | Delaney et al. |
| 6,836,477 | B1 | 12/2004 | West, Jr. et al. |
| 6,839,336 | B2 | 1/2005 | Tiedemann, Jr. et al. |
| 6,842,506 | B1 | 1/2005 | Bedingfield |
| 6,940,866 | B1 | 9/2005 | Miller et al. |
| 7,046,692 | B1 | 5/2006 | Gradischnig |
| 7,088,728 | B2 | 8/2006 | Delaney et al. |
| 7,139,388 | B2 | 11/2006 | Rao |
| 7,260,086 | B2 | 8/2007 | Delaney et al. |
| 7,864,943 | B2 | 1/2011 | Davidson et al. |
| 8,041,021 | B2 | 10/2011 | Xu et al. |
| 2002/0054674 | A1 | 5/2002 | Chang et al. |
| 2002/0071543 | A1 | 6/2002 | Williams |
| 2002/0131427 | A1 | 9/2002 | Niermann |
| 2002/0186702 | A1 | 12/2002 | Ramos et al. |
| 2003/0202491 | A1 | 10/2003 | Tiedemann, Jr. et al. |
| 2003/0206562 | A1 | 11/2003 | Yi |
| 2004/0004956 | A1 | 1/2004 | Gilmour et al. |
| 2004/0015964 | A1 | 1/2004 | McCann et al. |
| 2004/0081206 | A1 | 4/2004 | Allison |
| 2004/0096049 | A1 | 5/2004 | Delaney et al. |
| 2004/0114533 | A1 | 6/2004 | Angermayr et al. |
| 2004/0137904 | A1 | 7/2004 | Gradischnig |
| 2004/0141493 | A1 | 7/2004 | Delaney et al. |
| 2004/0264674 | A1 | 12/2004 | Delaney et al. |
| 2005/0013290 | A1 | 1/2005 | Allison et al. |
| 2005/0013427 | A1 | 1/2005 | Breiholz et al. |
| 2005/0152278 | A1 | 7/2005 | Schantz |
| 2006/0039546 | A1 | 2/2006 | Davidson et al. |

FOREIGN PATENT DOCUMENTS

| | | |
|---|---|---|
| EP | 1 521 484 A1 | 4/2005 |
| WO | WO 97/11563 | 3/1997 |
| WO | WO 99/67928 | 12/1999 |
| WO | WO 00/67491 | 11/2000 |
| WO | WO 02/13545 A2 | 2/2002 |
| WO | WO 2006/023801 A2 | 3/2006 |
| WO | WO 2007/030257 A2 | 3/2007 |

OTHER PUBLICATIONS

Notification of Transmittal of the International Search Report and the Written Opinion of the International Searching Authority, or the Declaration for International Application No. PCT/US2021/041698 (dated Nov. 29, 2021).
Notice of Abandonment for U.S. Appl. No. 11/218,290 (dated Jun. 6, 2011).
Supplemental Notice of Allowability for U.S. Appl. No. 10/922,593 (dated Nov. 30, 2010).
Final Official Action for U.S. Appl. No. 11/218,290 (dated Nov. 29, 2010).
Interview Summary for U.S. Appl. No. 11/218,290 (dated Nov. 9, 2010).
Notice of Allowance and Fee(s) Due for U.S. Appl. No. 10/922,593 (dated Sep. 2, 2010).
Interview Summary for U.S. Appl. No. 10/922,593 (dated Jun. 8, 2010).
Official Action for U.S. Appl. No. 11/218,290 (dated May 5, 2010).
Final Official Action for U.S. Appl. No. 10/922,593 (dated Feb. 26, 2010).
Interview Summary for U.S. Appl. No. 10/922,593 (dated Oct. 30, 2009).
Official Action for U.S. Appl. No. 10/922,593 (dated Oct. 14, 2009).
Final Official Action for U.S. Appl. No. 10/922,593 (dated May 18, 2009).
Official Action for U.S. Appl. No. 10/922,593 (dated Oct. 29, 2008).
Notification Concerning Transmittal of International Preliminary Report on Patentability for International Application No. PCT/US2006/031168 (dated Mar. 13, 2008).
Notification of Transmittal of the International Search Report and the Written Opinion of the International Searchig Authority, or the Declaration for International Application No. PCT/US06/31168 (dated Apr. 25, 2007).
Notification Concerning Transmittal of International Preliminary Report on Patentability for International Application No. PCT/US2005/029670 (dated Mar. 1, 2007).
Notification of Transmittal of the International Search Report and the Written Opinion of the International Searching Authority, or the Declaration in International Application No. PCT/US05/29670 (dated Feb. 7, 2006).
Russell, "Signaling System #7: Sequence Numbering," Chapter 5, pp. 170-171 (Copyright 2000).
"Signalling System No. 7—ISDN User Part Functional Description," ITU-T, Q.762 (Dec. 1999).
"Signalling System No. 7—ISDN User Part Functional Description," ITU-T, Q.761 (Dec. 1999).
Tekelec, "Eagle® Feature Guide," PN/9110-1225-01 (Jan. 1998).
Comer, "Internetworking with TCP/IP vol. I: Principles, Protocols, and Architecture: 13.22 Initial Sequence Numbers," p. 217 (Copyright 1995).
Communication pursuant to Article 94(3) EPC for European Application No. 04 702 497.1 (dated Sep. 22, 2010).
Notification of Transmittal of the International Search Report and the Written Opinion of the International Searching Authority, or the Declaration for International Application No. PCT/US06/22875 (dated Sep. 13, 2007).
Notice of Allowance for U.S. Appl. No. 10/397,774 (dated Jun. 28, 2007).
Official Action for U.S. Appl. No. 10/397,774 (dated Mar. 6, 2007).
Supplemental Notice of Allowability for U.S. Appl. No. 10/345,632 (dated Jul. 3, 2006).
Supplemental Notice of Allowability for U.S. Appl. No. 10/345,632 (dated May 2, 2006).
Notice of Allowance and Fee(s) Due for U.S. Appl. No. 10/345,632 (dated Apr. 11, 2006).
Supplementary European Search Report in European Application No. EP 04 70 2497 (dated Feb. 13, 2006).
Official Action for U.S. Appl. No. 10/345,632 (dated Sep. 8, 2005).
Notification Concerning Transmittal of International Preliminary Report on Patentability (Chapter 1 of the Patent Cooperation Treaty) in International Application No. PCT/US2004/001004 (dated Aug. 4, 2005).
Notification of Transmittal of the International Search Report and the Written Opinion of the International Searching Authority, or the Declaration in International Application No. PCT/US04/00999 (dated Apr. 6, 2005).
European Search Report in European Application No. EP 04 70 2535 (dated Apr. 10, 2006).
Supplementary European Search Report in European Application No. EP 04 70 2535 (dated Mar. 22, 2006).
Official Action for U.S. Appl. No. 10/345,632 (dated Nov. 16, 2004).

(56) References Cited

OTHER PUBLICATIONS

Notice of Publication for European Patent Application Serial No. 21758839.1 (dated Aug. 23, 2023).

METHODS, SYSTEMS, AND COMPUTER READABLE MEDIA FOR LOAD SHARING CLASS 1 SIGNALING CONNECTION CONTROL PART (SCCP) MESSAGES

TECHNICAL FIELD

The subject matter described herein relates to load sharing SS7 messages. More particularly, the subject matter described herein relates to methods, systems, and computer readable media for load sharing class 1 SCCP messages.

BACKGROUND

In SS7 signaling networks, the signaling connection control part (SCCP) is used by applications to access databases and other services. In particular, SCCP is used by the mobile application part (MAP) and the transaction capabilities application part (TCAP), as well as other level four protocols to communicate application level information. SCCP service is divided into five classes. The classes are class 0, which provides basic connectionless service, class 1, which provides sequenced connectionless service, class 2, which provides basic connection oriented service, class 3, which provides flow controlled connection oriented service, and class 4, which provides error recovery and flow controlled connection oriented service. Currently, classes 2, 3, and 4 are not used in telecommunications networks. Both class 0 and class 1 are used. Class 0 services provide for the basic transport of TCAP and other application layer messages when sequencing is not required. Class 1 is used to provide sequenced service whenever more than one SCCP message exists for a transaction.

SCCP processing can be performed at any node in a signaling network. Typically, SCCP routing functions, such as global title translation, are performed at signal transfer points (STPs). Performing SCCP routing at STPs allows service switching points to send messages to the STPs where the messages are global title translated and routed to their intended destinations. Global title translation translates SCCP level information into a point code and subsystem number that can be used to route a message to its destination. Parameters other than SCCP level information, such as the originating point code (OPC), can also be used in the global title translation.

Many network operators provision redundant database nodes in their networks that provide the same service and load share messages among the redundant database nodes. One example of a database node that is often provided redundantly is the home location register (HLR). HLRs store subscription information for mobile subscribers and are contacted any time a home subscriber registers at a new location and to obtain routing information to route calls and short message service (SMS) messages to mobile subscribers.

As the number of subscribers in a network increases, the number of HLRs may likewise increase, and the network operator may desire to distribute the database processing among multiple HLRs. Load sharing processing among multiple HLRs or other database nodes can be implemented using load sharing at the STP. Class 0 SCCP messages are relatively easy to load share because the transactions carried by class 0 messages are single message transactions, such as database query. Stated differently, different class 0 SCCP messages are related to different transactions and thus can be load balanced among database nodes that process the transactions without regard to the database nodes to which other class 0 SCCP messages are routed.

In contrast to class 0 SCCP messages, class 1 SCCP messages are used when more than one message exists for a TCAP transaction carried by the class 1 SCCP messages. Class 1 SCCP messages can be load shared among database nodes. However, the load sharing must be performed in a manner that routes SCCP messages that are part of the same transaction to the same database node. Existing methods for load sharing class 1 SCCP messages among database nodes utilize MTP, SCCP, or TCAP parameters to define the load sharing key for class 1 SCCP messages. Each of these messages has at one or more problems. For example, using the SCCP called party address as the load sharing key results in all messages with the same called party address being routed to the same database node. Routing all messages with the same called party address to the same database node may result in the one database node being overloaded while the other database nodes are underutilized.

Using the TCAP transaction ID to load share class 1 SCCP messages among database nodes may not be effective because some class 1 SCCP messages, such as a TCAP END message, will not have the TCAP originator transaction ID. As a result, the TCAP END message may be routed to a different database node to other messages associated with the same TCAP transaction.

In another example, the MTP OPC and signaling link selector (SLS) may be used to load share class 1 SCCP messages. To achieve effective load sharing using the MTP OPC and SLS, there must be variation in the OPC and SLS values. OPC values will not vary widely in some cases, such as when a large number of messages originate from the same mobile switching center (MSC) and thus have the same OPC. Given that the load sharing algorithm relies on the OPC, messages with the same OPC would tend to be routed to the same destination node, resulting in uneven load balancing. In one example where load sharing keys were based on the above-described parameters, a difference in 300% in traffic occurred between the node receiving the most traffic and the node receiving the least traffic.

In light of these and other challenges, there exists a need for improved, methods, and non-transitory computer-readable media for load sharing class 1 SCCP messages.

SUMMARY

A method for load sharing class 1 signaling connection control part (SCCP) messages includes receiving a class 1 SCCP message requiring global title translation (GTT). The method further includes performing GTT for the message to select a load sharing group for the message. The method further includes generating a message signal unit (MSU) load sharing key using parameters from a combination of message transfer part (MTP) layer parameters and signaling connection control part (SCCP) layer parameters. The method further includes using the MSU load sharing key to select a destination address from the load sharing group for the message. The method further includes inserting the destination address into the message. The method further includes routing the message to a destination corresponding to the destination address.

According to another aspect of the subject matter described herein, receiving a class 1 SCCP message requiring GTT includes receiving the class 1 SCCP message at an SS7 signal transfer point (STP).

According to another aspect of the subject matter described herein, receiving a class 1 SCCP message requiring GTT includes receiving the class 1 SCCP message from a mobile switching center (MSC).

According to another aspect of the subject matter described herein, generating the MSU load sharing key using the MTP layer parameters and the SCCP layer parameters includes generating the MSU load sharing key using a called party global title (CdGT), an originating point code (OPC), and a signaling link selector (SLS) from the message.

According to another aspect of the subject matter described herein, generating the MSU load sharing key using the CdGT, the OPC, and the SLS from the message includes generating the MSU load sharing key by using values derived from the CdGT, the OPC, and the SLS to perform lookups in arrays of pseudorandomly generated values and computing the MSU load sharing key from values obtained from the lookups.

According to another aspect of the subject matter described herein, generating the MSU load sharing key generating the MSU load sharing key by using values derived from the CdGT, the OPC, and the SLS to perform lookups in arrays of pseudorandomly generated values and computing the MSU load sharing key from values obtained from the lookups includes generating the MSU load sharing key using the following equation:

MSUKEY=MOD($V$LOOKUP(MOD(OPC, Max_Dests),OPCArray)+$V$LOOKUP(SLS,SLS Array)+$V$LOOKUP(MOD(CdGT,Max_Dests), OPCArray),Max_Dests), where MSUKEY is the MSU load sharing key, MOD is a modulo function, VLOOKUP is a lookup function that performs a lookup in an array, OPC is the OPC from the message, OPCArray is an array of pseudorandomly generated values, SLS is the SLS from the message, SLSArray is an array of pseudorandomly generated values, and GdGT is the called party global title from the message and Max_Dests is the maximum number of destinations for load sharing.

According to another aspect of the subject matter described herein, generating the MSU load sharing key using the CdGT, the OPC, and the SLS includes generating the MSU load sharing key by computing a value from the CdGT and using the OPC and the SLS to perform lookups in arrays of pseudorandomly generated values.

According to another aspect of the subject matter described herein, generating the MSU load sharing key using the CdGT, the OPC, and the SLS includes generating the MSU load sharing key by computing a value from the CdGT and using the OPC and the SLS to perform lookups in arrays of pseudorandomly generated values includes generating the MSU load sharing using the following equation:

MSUKEY=MOD($V$LOOKUP(MOD(OPC, Max_Dests),OPCArray)+$V$LOOKUP(SLS,SLS Array)+MOD(CdGT,Max_Dests),Max_Dests), where MSUKEY is the MSU load sharing key, MOD is a modulo function, VLOOKUP is a lookup function that performs a lookup in an array, OPC is the originating point code from the message, OPCArray is an array of psuedorandomly generated values, SLS is the signaling link selector from the message, SLSArray is an array of pseudorandomly generated values, and CdGT is the called party global title from the message.

According to another aspect of the subject matter described herein, generating the MSU load sharing key using MTP and SCCP parameters includes generating the same MSU load sharing key for class 1 SCCP messages that are part of the same transaction capabilities application part (TCAP) transaction.

According to another aspect of the subject matter described herein, routing the message to a destination corresponding to the destination address includes routing the message to a home location register (HLR).

According to another aspect of the subject matter described herein, a system for load sharing class 1 signaling connection control part (SCCP) messages is provided. The system includes an SS7 signal transfer point (STP) including at least one processor and a memory. The system further includes a class 1 SCCP load sharing module implemented by the at least one processor for receiving a class 1 SCCP message requiring global title translation (GTT), performing GTT for the message to select a load sharing group for the message; generating a message signal unit (MSU) load sharing key using parameters from a combination of message transfer part (MTP) layer parameters and signaling connection control part (SCCP) layer parameters, using the MSU load sharing key to select a destination address from the load sharing group for the message, and inserting the destination address into the message. The system further includes a routing module implemented by the at least one processor for routing the message to a destination corresponding to the destination address.

According to another aspect of the subject matter described herein, the class 1 SCCP message is from a mobile switching center (MSC).

According to another aspect of the subject matter described herein, the class 1 SCCP load sharing module is configured to generate the MSU load sharing key using a called party global title (CdGT), an originating point code (OPC), and a signaling link selector (SLS) from the message.

According to another aspect of the subject matter described herein, the class 1 SCCP load sharing module is configured to generate the MSU load sharing key by using values derived from the CdGT, the OPC, and the SLS to perform lookups in arrays of pseudorandomly generated values and compute the MSU load sharing key from values obtained from the lookups.

According to another aspect of the subject matter described herein, the class SCCP load sharing module is configured to generate the MSU load sharing key by using the following equation;

MSUKEY=MOD($V$LOOKUP(MOD(OPC, Max_Dests),OPCArray)+$V$LOOKUP(SLS,SLS Array)+$V$LOOKUP(MOD(CdGT,Max_Dests), OPCArray),Max_Dests), where MSUKEY is the MSU load sharing key, MOD is a modulo function, VLOOKUP is a lookup function that performs a lookup in an array, OPC is the originating point code from the message, OPCArray is an array of pseudorandomly generated values, SLS is the signaling link selector from the message, SLSArray is an array of pseudorandomly generated values, and GdGT is the called party global title from the message and Max_Dests is the maximum number of destinations for load sharing.

According to another aspect of the subject matter described herein, the class 1 SCCP load sharing module is configured to generate the MSU load sharing key by computing a value from the CdGT and using the OPC and the SLS to perform lookups in arrays of pseudorandomly generated values.

According to another aspect of the subject matter described herein, the class 1 SCCP load sharing module is configured to generate the MSU load sharing key using the following equation:

$$\text{MSUKEY} = \text{MOD}(V\text{LOOKUP}(\text{MOD}(\text{OPC},\text{Max\_Dests}),\text{OPCArray}) + V\text{LOOKUP}(\text{SLS},\text{SLSArray}) + \text{MOD}(\text{CdGT},\text{Max\_Dests}),\text{Max\_Dests}),$$

where MSUKEY is the MSU load sharing key, MOD is a modulo function, VLOOKUP is a lookup function that performs a lookup in an array, OPC is the originating point code from the message, OPCArray is an array of psuedo-randomly generated values, SLS is the signaling link selector from the message, SLSArray is an array of pseudo-randomly generated values, and CdGT is the called party global title from the message.

According to another aspect of the subject matter described herein, the class 1 SCCP load sharing module is configured to generate the same MSU load sharing key for class 1 SCCP messages that are part of the same transaction capabilities application part (TCAP) transaction.

According to another aspect of the subject matter described herein, the destination comprises a home location register (HLR).

According to another aspect of the subject matter described herein, a non-transitory computer readable medium having stored thereon executable instructions that when executed by a processor of a computer control the computer to perform steps is provided. The steps include receiving a class 1 signaling connection control part (SCCP) message requiring global title translation (GTT). The steps further includes performing GTT for the message to select a load sharing group for the message. The steps further include generating a message signal unit (MSU) load sharing key using parameters from a combination of message transfer part (MTP) layer parameters and signaling connection control part (SCCP) layer parameters. The steps further include using the MSU load sharing key to select a destination address from the load sharing group for the message. The steps further include inserting the destination address into the message. The steps further include routing the message to a destination corresponding to the destination address.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for load sharing class 1 SCCP messages. As described above, conventional methods that rely on MTP level parameters alone, SCCP parameters alone, or TCAP parameters alone fail to achieve a distribution of class 1 SCCP messages with an acceptable level of variance in traffic load. The subject matter described herein achieves load balancing of class 1 SCCP messages with reduced variation in traffic among network nodes while ensuring that class 1 SCCP messages relating to the same transaction are routed to the same destination node. In one example, such load balancing is achieved using the SCCP called party global title (CdGT) parameter in combination with the MTP level 3 signaling link selector (SLS) and the MTP level 3 originating point code (OPC) to generate an MSU load sharing key. The MSU load sharing key is used to select a destination address for a message, and the message is routed to the destination address.

Figure 1:
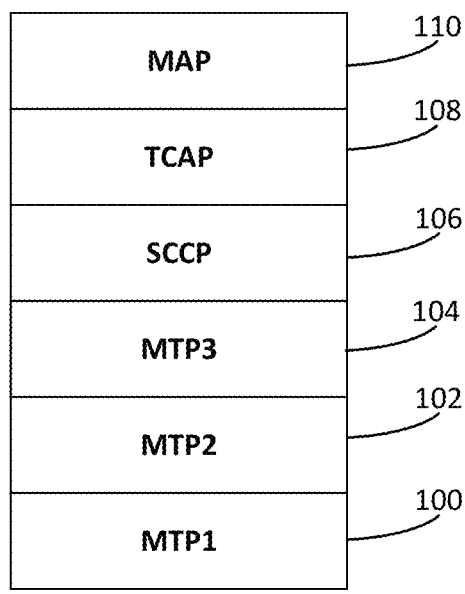
FIG. 1 is a protocol layering diagram illustrating protocol layers that may be used by an SS7 message signal unit for transmission over a traditional TDM-based SS7 signaling link.

FIG. 1 is a diagram illustrating exemplary protocol layers that can be used in transmitting an SS7 message over a traditional time division multiplexing (TDM)-based SS7 signaling link. The protocol layers each correspond to a portion of the SS7 message that is used by the corresponding protocol to effect message transport. In FIG. 1, the protocol layers include message transfer part level 1 (MTP1) 100, message transfer part level 2 (MTP2) 102, and message transfer part level 3 (MPT3) 104. MTP1 100 performs physical layer functions such as transmitting the message over a physical link. MTP2 102 is the data link level of the SS7 protocol stack and performs functions such as error detection, error correction, sequenced delivery of SS7 messages. MTP3 104 performs routing of SS7 message signaling units.

As stated above, each of the protocol layers in FIG. 1 correspond to part of an SS7 message. Each protocol layer includes various parameters that are used by receiving nodes to process the message. One such parameter is the routing label which resides in the MTP3 part of a message and includes parameters, such as the originating point code (OPC) and the destination point code (DPC) as well as the signaling link selector (SLS), which may be used to perform load sharing of class one SCCP messages.

The protocol layers in FIG. 1 further include signaling connection control part (SCCP) 106. SCCP 106 includes the called party global title (CdGT), which can also be used in combination with the MTP level three parameters to perform load sharing as will be described in detail below.

The protocol layers in FIG. 1 further include transaction capabilities application part (TCAP) 108 and mobile application part (MAP) 110. TCAP 108 performs transaction-based functions, such as communicating with database nodes. MAP 110 is an application layer that performs functions such as updating the location of mobile subscribers with a home location registers (HLRs) and obtaining the location of mobile subscribers from HLRs.

Figure 2:
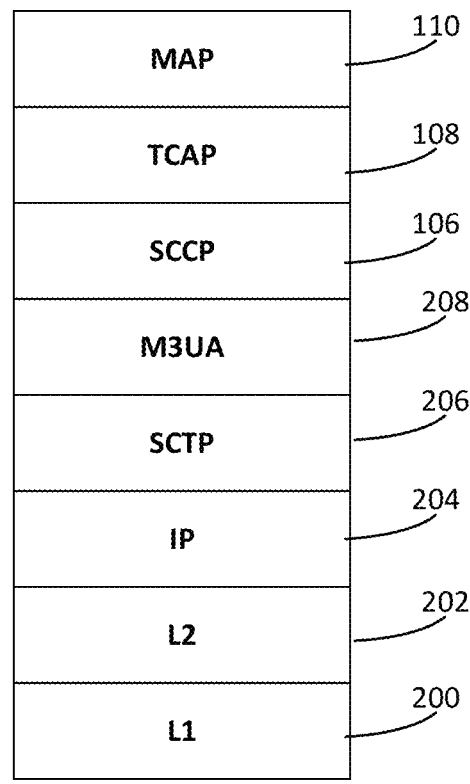
FIG. 2 is a protocol layering diagram illustrating exemplary protocol layers that may be used by an SS7 message signal unit for transmission over an IP-based signaling link.

In most networks today, SS7 messages are transmitted over IP-based signaling links instead of TDM-based signaling links that rely on MTP levels 1 and 2. FIG. 2 illustrates exemplary protocol layers that may be used to transmit an SS7 message over an IP network. Instead of MTP levels 1 and 2, the protocol layers in FIG. 2 includes open systems interconnect (OSI) level 1 200 and OSI level 2 202, which perform functions similar to those of MTP levels 1 and 2. However, different protocols are used. For example, in IP networks, IP level 2 can be implemented using Ethernet. OSI layer 1 can be implemented using any suitable physical layer protocol.

The protocol layers in FIG. 2 further include IP layer 204 which performs IP networking functions, stream control transmission protocol (SCTP) layer 206, which provides transport level connections between SS7 nodes. The protocol layers in FIG. 2 further include MTP3 user adaptation (M3UA) layer 208, which enables the transport of SS7 messages over the underlying IP network. M3UA layer 208 also performs the functions of MTP level 3, such as point code-based routing.

The remaining protocol layers and corresponding message structure in FIG. 2 are the same as those in FIG. 1. As a result, the SCCP load sharing algorithms described herein can be used to load share class 1 SCCP messages when the underlying transport layers are SS7-based as illustrated in FIG. 1 or IP-based as illustrated in FIG. 2.

Figure 3A:
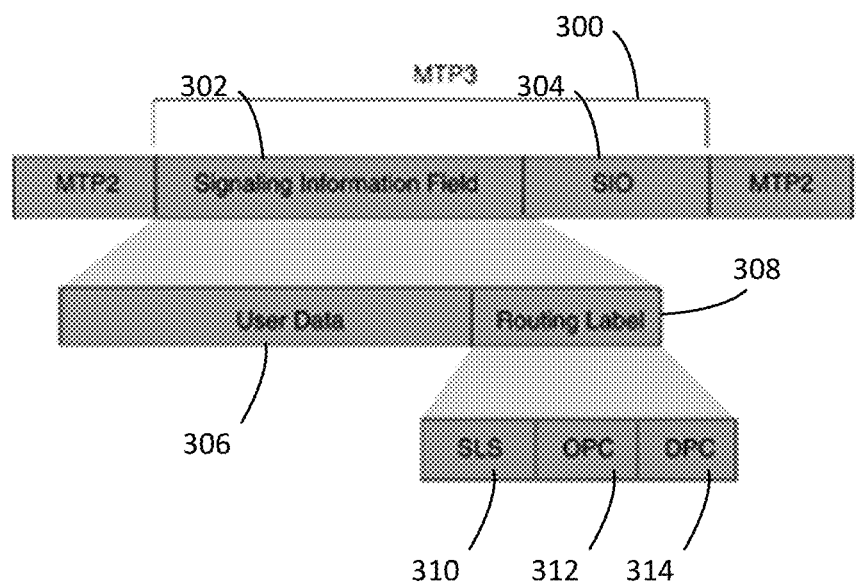
FIGS. 3A and 3B respectively illustrate a routing label and a signaling link selection field of an SS7 message.
Figure 3B:
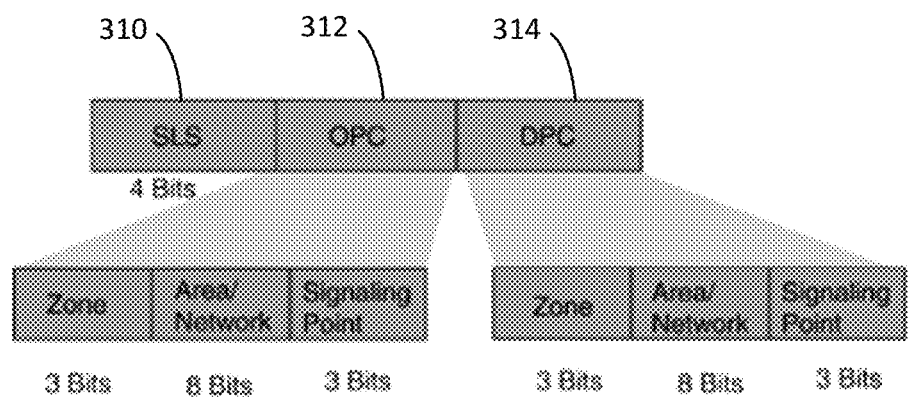

As stated above, one set of parameters that may be useful in performing load sharing of class 1 SCCP parameters are the OPC and SLS parameters, which are located in the MTP level 3 portion of the SS7 message. FIG. 3A and FIG. 3B respectively illustrate the MTP3 portion of an SS7 message and the routing label of an SS7 message, which contains the SLS and OPC values, Referring to FIG. 3A, the MTP3 portion 300 of a message includes signaling information field 302 and service indicator octet 304. Signaling information field 302 is divided into user data 306 and routing label 308. Routing label 308 is further divided into signaling link selection (SLS) field 310, originating point code field 312, and destination point code field 314. As will be described in detail below, a value derived from the value stored in the SLS field 310 that may be one parameter that is used in combination with other parameters to generate a load sharing key for load sharing class 1 SCCP messages.

FIG. 3B illustrates the details of the bits in the SLS, OPC, and DPC fields of the routing label for International Telecommunications Union (ITU)-formatted SS7 messages. It should be noted that although the message format illustrated in 3B is an ITU SS7 message format, the load sharing algorithms described herein can be used with other SS7 message formats without departing from the scope of the subject matter described herein. For example, the load sharing algorithms described herein can also be used with American National Standards Institute (ANSI) SS7 message formats in which the SLS is 5 or 8 bits.

Figure 4:
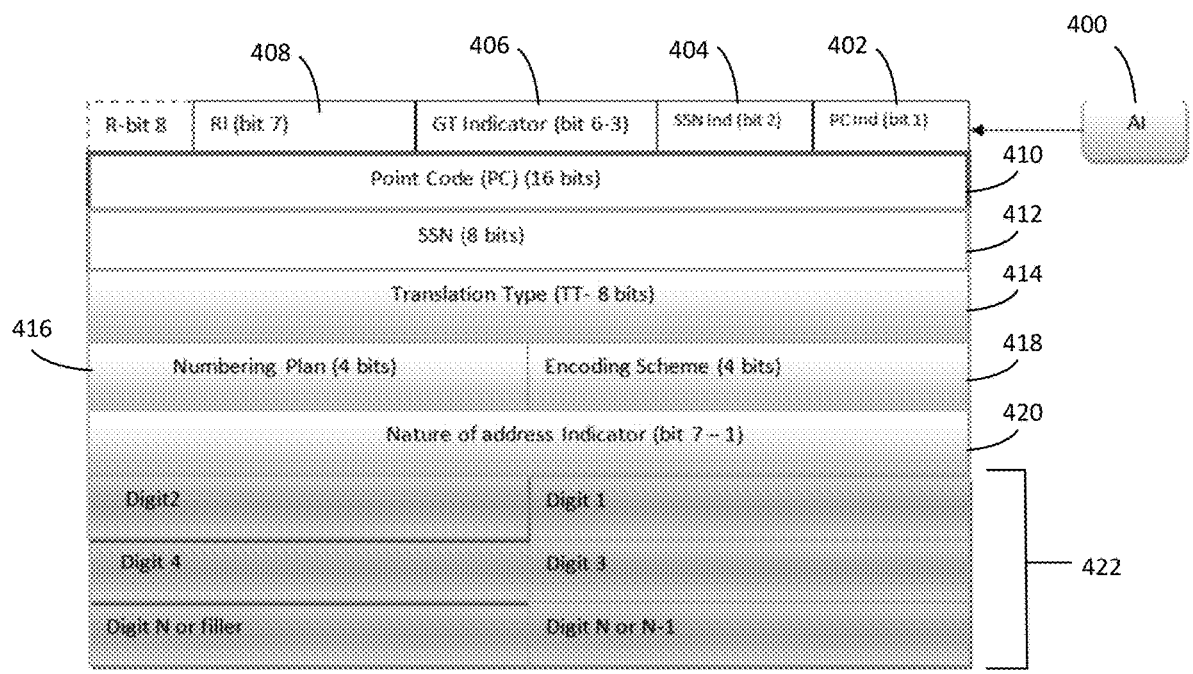
FIG. 4 is a diagram illustrating exemplary fields that can be include in the SCCP portion of a message.

FIG. 4 illustrates the portion of an SCCP message that contains the global title digits or address. Referring to FIG. 4, the SCCP portion of the message includes an address indicator 400, which contains various indicators about the type of SCCP address that is included in the SCCP part of the message and the type of SCCP routing being performed. In the illustrated example, address indicator 400 includes point code indicator 402, subsystem number indicator 404, global title indicator 406, and routing indicator 408. Point code indication 402 indicates whether a point code is present in the SCCP address or not. SSN indicator 404 indicates the presence of the SSN in the SCCP address or not. Global title indicator 406 indicates whether a global title address is present and, if present, the type of global title address. Routing indicator 408 indicates the type of routing (either route on global title or route on point code and subsystem number) to be performed for the SCCP message.

Point code 410 stores an SS7 node. Subsystem number 412 stores a value that indicates an application or subsystem to which the message is destined. Translation type 414 is a 1 byte parameter used to set whether an intermediate or final global title translation will be performed. Numbering plan 416 indicates the number type of the global title address.

Encoding scheme 418 indicates how the digits of the global title address are encoded. For example, one encoding scheme commonly used as binary-coded decimals (BCD). Nature of address indicator 420 represents the type of number, such as national or international, represented by the digits. Digits 422 are the called party global title, which is another of the parameters used by the algorithms described herein for load sharing class 1 SCCP messages.

Figure 5:
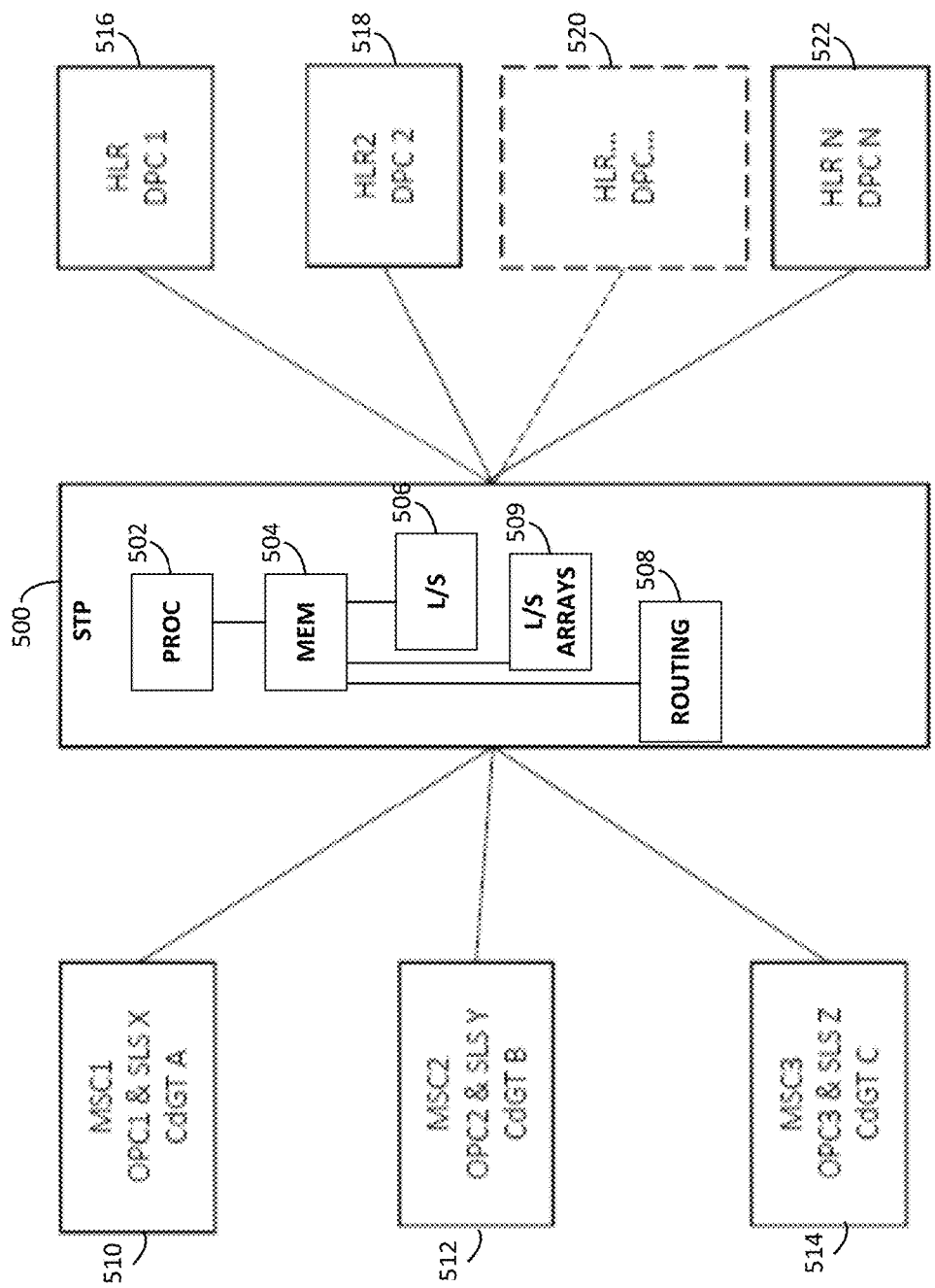
FIG. 5 is a block diagram illustrating an exemplary architecture for a signal transfer point that implements load sharing of class 1 SCCP messages.

FIG. 5 is the network diagram illustrating an STP capable of performing load sharing of class 1 SCCP messages. Referring to FIG. 5, STP 500 includes at least one processor 502 and memory 504. Although a detailed internal architecture for STP 500 will be described below, in the illustrated example, the functions that perform the steps described herein for load sharing class 1 SCCP messages are SCCP class 1 load sharing module 506 and routing module 508. Load sharing arrays 509 are accessed using values derived from various message parameters by SCCP load sharing module 506 to select the destination address for a received class 1 SCCP message and insert that destination address in the message. Routing module 508 routes the message to the outbound signaling link associated with the destination.

In the example illustrated and FIG. 5, the network includes MSCs 510, 512, and 514 and HLRs 516, 518, 520, and 522. MSCs 510, 512, and 514 originate class 1 SCCP messages destined for HLRs 516, 518, 520 and 522. STP 500 load shares the class 1 SCCP messages based on a combination of OPC, SLS, and CdGT. The load sharing performed by STP 500 is such that messages relating to the same transaction are load shared and routed to the same HLR. For example, an SCCP message originating from MSC1 may include OPC 1, SLS X, and CdGT A. Such a message will be load shared by STP 500 to one of HLRs 516, 518, 520, and 522. Additional messages from MSC1 that relate to the same transaction should be routed to the same HLR. Similarly, messages from MSC2 512 may have OPC 2, SLS Y, and CdGT B. Such messages will be load shared by STP 500 to one of HLRs 516, 518, 520, and 522 and likely a different HLR from those originating from MSC1

510. Similar load sharing is performed based on messages from MSC3 514, as these messages may include different parameters from those originating from MSCs 510 and 512.

It is understood that the message parameters in FIG. 5 are for illustrative purposes and that different combinations of parameters may be included in class 1 SCCP messages originating from the same MSC. For example, the OPC in messages originating from a given MSC will be the same. However, the CdGT may vary depending on the message type and the identity of the mobile device for which the message is being sent.

Figure 6:
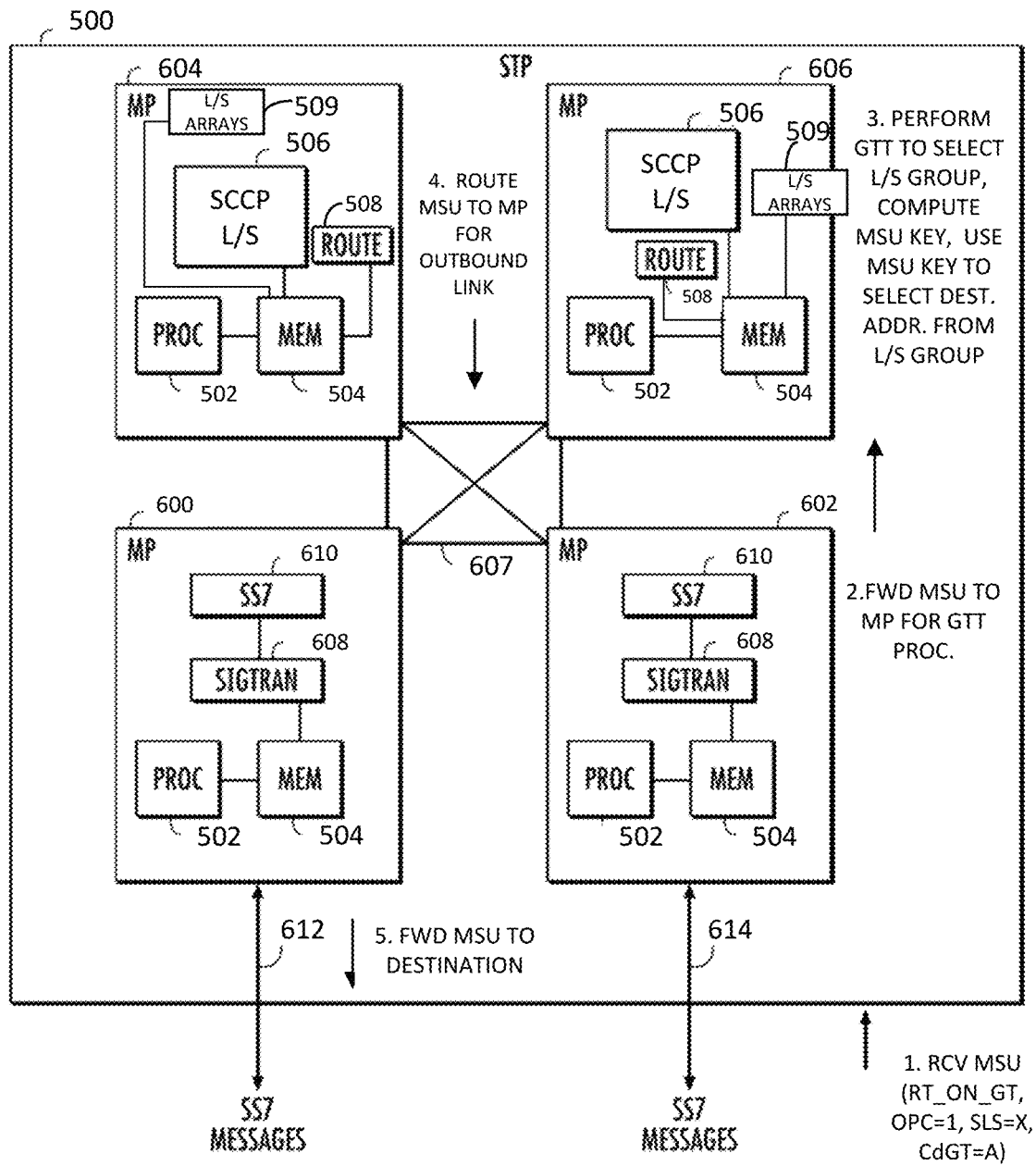
FIG. 6 is a block diagram an exemplary detailed architecture for a signal transfer point capable of load sharing class 1 SCCP messages.

FIG. 6 is a block diagram illustrating an exemplary internal architecture for STP 500. Referring to FIG. 6, STP 500 includes a plurality of message processors 600, 602, 604, and 606. Each message processor 600, 602, 604, and 606 may be a printed circuit board that includes at least one processor 502 and memory 504. Message processors 600, 602, 604, and 606 may be connected to each other through an inter-processor message transport medium 607. In one example, inter-processor message transport medium 607 may be a backplane connector, and Ethernet may be the datalink layer transport protocol used to transmit messages between message processors 600, 602, 604, and 606.

Message processor 600 and 602 each include a SIGTRAN layer 608 and SS7 layer 610. SIGTRAN layer 608 perform adaptation of SS7 messages for IP transport. In an alternate implementation, either of SIGTRAN layers 608 could be replaced by MTP levels 1 and 2 without departing from the scope of the subject matter described herein. SS7 layers 610 perform message discrimination to determine whether further processing by STP is required for a received message or if the message is to be routed only. For messages that are sent route on global title, SS7 layer 610 forward the messages to one of message processors 604 and 606 for further processing by STP 500. If a message requires routing only, SS7 layers 610 route the message to the message processor associated with one of outbound signaling links 612 and 614.

Message processors 604 and 606 each include SCCP class 1 load sharing module 506 for performing load sharing of class 1 SCCP messages and routing modules 508 for routing the messages after the load sharing and associated global title translation processing is performed.

In the message flow illustrated in FIG. 6, in step 1, message processor 602 receives an SS7 message sent route on global title with an OPC, an SLS, and a CdGT. In step 2, SS7 layer 610 of message processor 602 forwards the message to message processor 606 for global title translation processing. In step 3, load sharing module 506 on message processor 606 performs global title translation processing which includes performing a GTT lookup in a GTT table or array using the CdGT in the message to identify a load sharing group, which corresponds to a destination address array, for the message, generating an MSU load sharing key for the SS7 message, performing a lookup in the destination address array for the load sharing group using the MSU load sharing key to select a destination point code for the message, and inserting the destination point code in the message. A load sharing group, as used herein, is a group of destination addresses corresponding to network nodes capable of processing a given message. For example, a network operator may configure a load sharing group for a group of HLRs in the operator's network that are capable of processing messages relating to mobility of the operator's subscribers. The load sharing group may be implemented using a destination address array containing the addresses of the load sharing group.

In step 4, routing module 508 of message processor 606 routes the message to the message processor associated with the outbound signaling link, which is selected based on the destination point code in the message after global title translation. In step 5, message processor 600, which is associated with outbound signaling link 612, sends the message to the destination via outbound signaling link 612.

As stated above, load sharing module 506 performs load sharing of class 1 SCCP messages in a manner that increases the evenness of distribution of the SCCP messages among destination nodes and that ensures that messages related to the same transaction or routed to the same node. In one method, load sharing module 506 uses values derived from the OPC, SLS, and CdGT to perform lookups in arrays of pseudorandomly generated (e.g., generated using a random number generation function) values. In one example, this algorithm is as follows:

$$\text{MSUKEY} = \text{MOD}(\textit{VLOOKUP}(\text{MOD}(\text{OPC},100),\text{OPCArray}) + \textit{VLOOKUP}(\text{SLS},\text{SLS Array}) + \textit{VLOOKUP}(\text{MOD}(\text{CdGT},100),\text{OPCArray}),100) \quad (1)$$

In Equation 1 above, MSUKEY is the MSU load sharing key used to perform the lookup in the destination array. MOD is the modulo function, which returns the remainder when the first argument of the function is divided by the second argument. For example, in Equation 1, MOD(OPC, 100) returns the remainder when the OPC value in the message is divided by 100. Equation 1 is configured for load balancing of up to 100 destinations. To extend Equation 1 to arbitrary numbers of destinations, the constant 100 can be replaced by Max_Dests, which indicates the maximum number of load sharing destinations, as shown in Equation 2 below:

$$\text{MSUKEY} = \text{MOD}(\textit{VLOOKUP}(\text{MOD}(\text{OPC},\text{Max\_Dests}),\text{OPCArray}) + \textit{VLOOKUP}(\text{SLS},\text{SLS Array}) + \textit{VLOOKUP}(\text{MOD}(\text{CdGT},\text{Max\_Dests}),\text{OPCArray}),\text{Max\_Dests}) \quad (2)$$

Continuing with the explanation of Equations 1 and 2, the function VLOOKUP(x,y) returns the value in array y stored at array element x. For example, in Equation 1, the function MOD(OPC, 100), OPCArray) returns the value located at element (MOD(OPC, 100)) in the OPC array. The OPC array is an array of size Max_Dests, which in this case is 100. Each element in the array stores a value that is used to compute the MSU Key. In one example, the values of stored in the array may each be a number pseudorandomly generated within the range [0, Max_Dests−1]. Table 1 shown below is an example of an OPC array for load sharing between 100 destination nodes.

TABLE 1

Example OPC Array

| Array Index | Value (Decimal) | Value (Hex) |
|---|---|---|
| 0 | 55 | 37 |
| 1 | 36 | 24 |
| 2 | 16 | 10 |
| 3 | 32 | 20 |
| 4 | 85 | 55 |
| 5 | 11 | 0b |
| 6 | 27 | 1b |
| 7 | 84 | 54 |
| 8 | 14 | 0e |
| 9 | 56 | 38 |
| 10 | 8 | 8 |
| 11 | 74 | 4a |
| 12 | 46 | 2e |
| 13 | 93 | 5d |

TABLE 1-continued

Example OPC Array

| Array Index | Value (Decimal) | Value (Hex) |
|---|---|---|
| 14 | 42 | 2a |
| 15 | 23 | 17 |
| 16 | 4 | 4 |
| 17 | 31 | 1f |
| ... | ... | ... |
| 91 | 75 | 4b |
| 92 | 58 | 3a |
| 93 | 29 | 1d |
| 94 | 62 | 3e |
| 95 | 78 | 4e |
| 96 | 9 | 9 |
| 97 | 69 | 45 |
| 98 | 43 | 2b |
| 99 | 81 | 51 |

For simplification, rows 18-90 are omitted from the OPC array. In Table 1, the first column is the array index, the second column includes the pseudorandomized values between 0 and 99 in decimal stored at each array index, and the third column contains the value of the second column in hexadecimal. Thus, the result of the term VLOOKUP(MOD (OPC, 100),OPCArray) is a psuedorandomly generated value between 0 and 99 that is selected based on a value derived from the OPC in the message. For example, if the OPC in the message is 11392 (in decimal), MOD(11392, 100) returns 92. The value of VLOOKUP(92,OPCArray) is 58 or 3a in hexadecimal.

Continuing with the second term in Equation 1, VLOOKUP(SLS, SLSArray) performs a lookup in SLSArray using the value of the SLS in the received message. From FIG. 3, the SLS is a 4 bit value, which means that there are 16 possible SLS values. SLS Array can thus be an array of size 16 that returns one of 16 possible pseudorandomly values using the SLS as the lookup key. Table 2 is an example of an SLS array for use in an ITU network where the SLS is 4 bits. In an ANSI network in which the SLS has 8 bits, the SLS array would include 2^8 or 256 bits.

TABLE 2

Example SLS Array

| SLS Value | Value |
|---|---|
| 0 | 60 |
| 1 | 4 |
| 2 | 22 |
| 3 | 79 |
| 4 | 85 |
| 5 | 29 |
| 6 | 10 |
| 7 | 66 |
| 8 | 72 |
| 9 | 41 |
| 10 | 47 |
| 11 | 16 |
| 12 | 98 |
| 13 | 54 |
| 14 | 35 |
| 15 | 91 |

In Table 2, the first column includes the array indices, each corresponding to one of the 16 possible SLS values. The second column includes the pseudorandomly generated values stored in the array elements. Thus, if the SLS value is 0, VLOOKUP(0, SLSArray) will return 60.

The next term in Equation 1 is VLOOKUP(MOD(CdGT, 100), OPCArray). This term performs a lookup based on a value derived from the CdGT in the message. Since the output of XMODY has Y−1 possible values ranging from 0 to Y, the value of CdGTMOD(100) is a number ranging from 0 to 99 based on the CdGT. Depending on the message type, the called party global title can be the B party (called party) number or a routing number corresponding to an HLR. Assuming that that the called party in the message is 12345600, the last term of Equation 1 will return the following value:

$$VLOOKUP(MOD(12345600(100), OPCArray) =$$
$$VLOOKUP(0, OPCArray) = 55$$

It can be seen from Equations 1 and 2 that the same arrays are used to perform the lookups using the values derived from the OPC and the CdGT. However, the subject matter described herein is not limited to using the same array to perform these lookups. In an alternate implementation, a value derived from the OPC in the message may be used to perform a lookup in a first array of psuedorandomly generated values, and a value derived from the CdGT in the message may be used to perform a lookup in a second array of pseudorandomly generated values that is different from the first array.

The terms inside the outermost parentheses in Equation 1 are added together, and the sum forms the first term in the outermost MOD function. Continuing with the examples above, the values returned by the three array lookups (OPC, SLS, and CdGT) are 58, 60, and 55, respectively. The sum of these three terms is 173. The second term of the outermost MOD operation is 100, the maximum number of destinations for the load sharing. Thus, the effect of the outermost MOD function us to compute a number between 0 and 99, where the resulting number can be used to perform a lookup in the destination address table. Continuing with the example, the value of MOD(173,100) is 73, so the MSU key value of 73 would be used to perform the lookup in the destination address array for the load sharing group identified in the GTT lookup:

TABLE 3

Example Destination Address Array

| MSUKEY | DEST ADDR |
|---|---|
| 1 | 1-1-0 |
| 2 | 1-1-1 |
| 3 | 1-1-2 |
| ... | ... |
| 73 | 2-2-0 |
| 74 | 2-2-1 |
| 75 | 2-2-3 |
| 76 | 2-2-4 |
| ... | ... |
| 97 | 3-3-0 |
| 98 | 3-3-1 |
| 99 | 3-3-2 |
| 100 | 3-3-3 |

The lookup in the destination address array using the MSU key 73 as the lookup key would return the destination point code of 2-2-0. SCCP class 1 load sharing module 506 inserts the destination point code from the destination address array into the message, Routing module 508 uses the DPC value to perform a lookup in an MTP level 3 or M3UA routing table, selects an outbound linkset for the message, and forwards the message to the message processor associated with the outbound signaling link. The message processor associate with the outbound signaling link forwards the message to its destination over the outbound signaling link.

In the examples above, the MSU key value is used unmodified to perform the lookup in the destination array. In an alternate implementation, to reduce the size of the destination address array, SCCP class 1 load sharing module 506 may compute MSUKeyMOD(x), where x is the number of entries in the destination address array, and use the result to perform the lookup in the destination array.

Figure 7A:
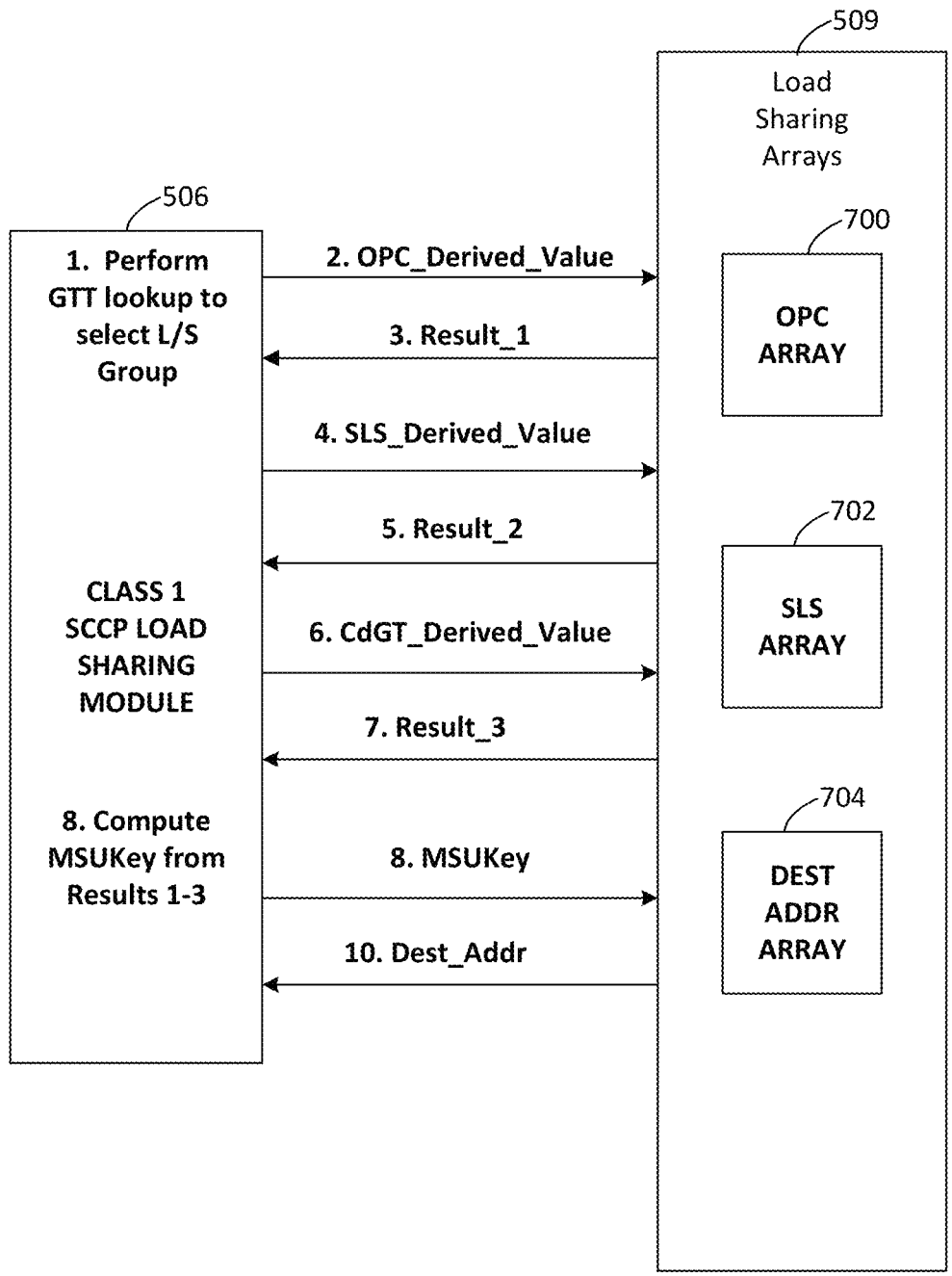
FIG. 7A is a diagram illustrating load sharing of class 1 SCCP message using a first load sharing algorithm descried herein.

FIG. 7A illustrates an overview of the load sharing algorithm for generating MSU key 1. Referring to FIG. 7A, in step 1, load sharing module 506 performs GTT to select a load sharing group, which corresponds to a destination address array, for the message. In step 2, load sharing module 506 uses the OPC-derived value from the message to perform a lookup in OPC array 700. In step 3, OPC array 700 returns a first load sharing value, Result_1. In step 4, load sharing module 506 performs a lookup in SLS array 702 using the value derived from the SLS in the message. In step 5, SLS array 702 returns Result_2. In step 6, load sharing module 506 performs a lookup in OPC array 700 using the value derived from the CdGT in the message. In step 7, OPC array 700 returns the Result_3. In step 8, load sharing module 506 computes the MSU key using Result_1, Result_2, Result_3, and Equation 1 above. In step 9, load sharing module 506 uses the MSU key to perform a lookup in destination address array 704 that maps MSU key values to destination point codes. In step 10, the result of the lookup is the destination point code of the destination for the message. As stated above, load sharing module 506 inserts the destination point code in the message and routing module 508 routes the message to the message processor associated outbound signaling link. The message processor associated with the outbound signaling link forwards the message to the destination, which in one example is an HLR.

In an alternate implementation, load sharing module 506 uses a value computed from CdGT from the message (without performing a lookup in an array of pseudorandomly generated values using the CdGT as input) in combination with values obtained from the OPC and SLS arrays. Equation 3 shown below illustrates the alternate algorithm.

$$\text{MSUKEY}=\text{MOD}(V\text{LOOKUP}(\text{MOD}(\text{OPC},100),\text{OPCArray})+V\text{LOOKUP}(\text{SLS},\text{SLS Array})+\text{MOD}(\text{CdGT},100),100) \quad (3)$$

In Equation 3, the functions and the terms have the same meanings as Equation 1. Hence, a description of these terms will not be repeated. As with Equation 1, Equation 3 is designed for load sharing among a maximum of 100 destinations. However, the concept of Equation 3 can be applied to an arbitrary number of destinations by replacing the constant 100 in Equation 3 with Max_Dests, a constant equal to the maximum number of destinations for load sharing, as indicated by Equation 4.

$$\text{MSUKEY}=\text{MOD}(V\text{LOOKUP}(\text{MOD}(\text{OPC},\text{Max\_Dests}),\text{OPCArray})+V\text{LOOKUP}(\text{SLS},\text{SLS Array})+\text{MOD}(\text{CdGT},\text{Max\_Dests}),\text{Max\_Dests}) \quad (4)$$

The difference between Equations 3 and 4 is that in the last addend, rather than using the CdGT to perform a lookup in an array of pseudorandomly generated values, the MOD of the CdGT and Max_Dests is used. Using the same OPC, SLS and CdGT values from the example above for the first algorithm, OPC=11392, SLS=0, and CdGT=12345600, the results of the lookups in the OPC and SLS arrays would be the same and respectively return 58 and 60. The third term of Equation 3 would be determined as follows:

$$\text{MOD}(CdGT, 100) = \text{MOD}(12345600, 100) = 0$$

The MSUKey from Equation 3 would be:

$$\begin{aligned} MSUKey &= \text{MOD}(58 + 60 + 0, 100) \\ &= \text{MOD}(118, 100) \\ &= 18. \end{aligned}$$

The value of the MSU key is then used to perform a lookup in the destination address array and yields a destination point code, which is inserted in the message. The message is then routed to the destination associated with the destination point code.

Figure 7B:
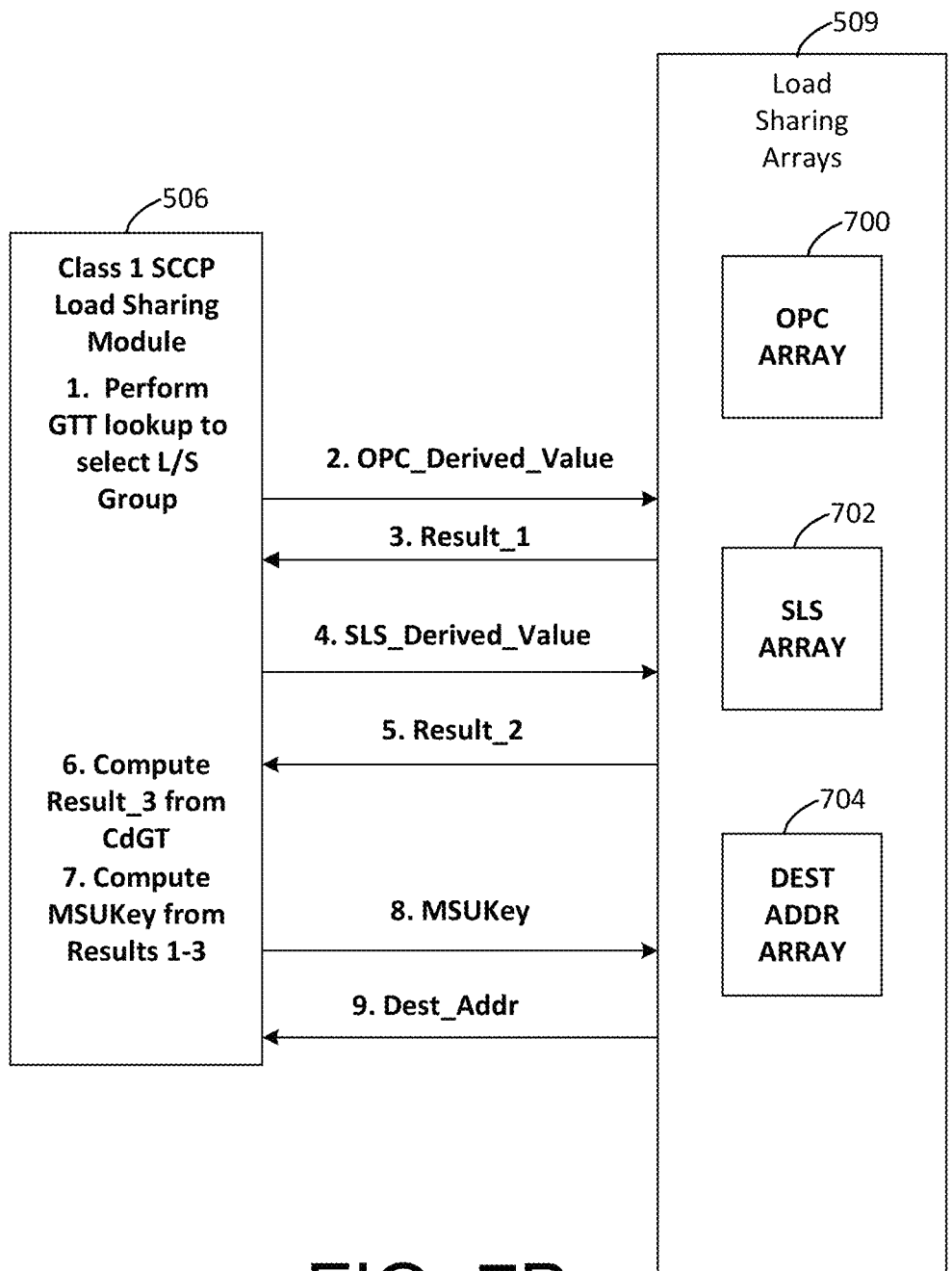
FIG. 7B is a diagram illustrating load sharing of class 1 SCCP message using a first load sharing algorithm descried herein.

FIG. 7B is a message flow diagram illustrating how load sharing module 506 computes and uses the MSUKey using the algorithm of Equations 3 and 4. Referring to FIG. 7B, in step 1, load sharing module 506 performs GTT on the message to select a load sharing group, which corresponds to a destination address array, for the message. In step 2, load sharing module 506 uses the value derived from the OPC in the message to perform a lookup in OPC array 700. In step 3, OPC array 700 returns Result_1. In step 4, load sharing module 506 uses the value derived from the SLS in the message to perform a lookup in SLS array 702. In step 5, SLS array 702 returns Result_2. In step 6, rather than performing a lookup in an array, load sharing module 506 computes Result_3 from the CdGT in the message using the modulo function. In step 7, load sharing module 506 computes the MSU key from Results 1-3 using Equation 3 or 4. In step 8, load sharing module 506 uses the MSUKey to perform a lookup in destination address array 706, which returns, in step 9, a DPC value. Load sharing module 506 then inserts the DPC value in the message and passes the message to routing module 508. Routing module 508 routes the message to the message processor associated with the outbound signaling link. The message processor associated with the outbound signaling link forwards the message to its intended destination.

Figure 8:
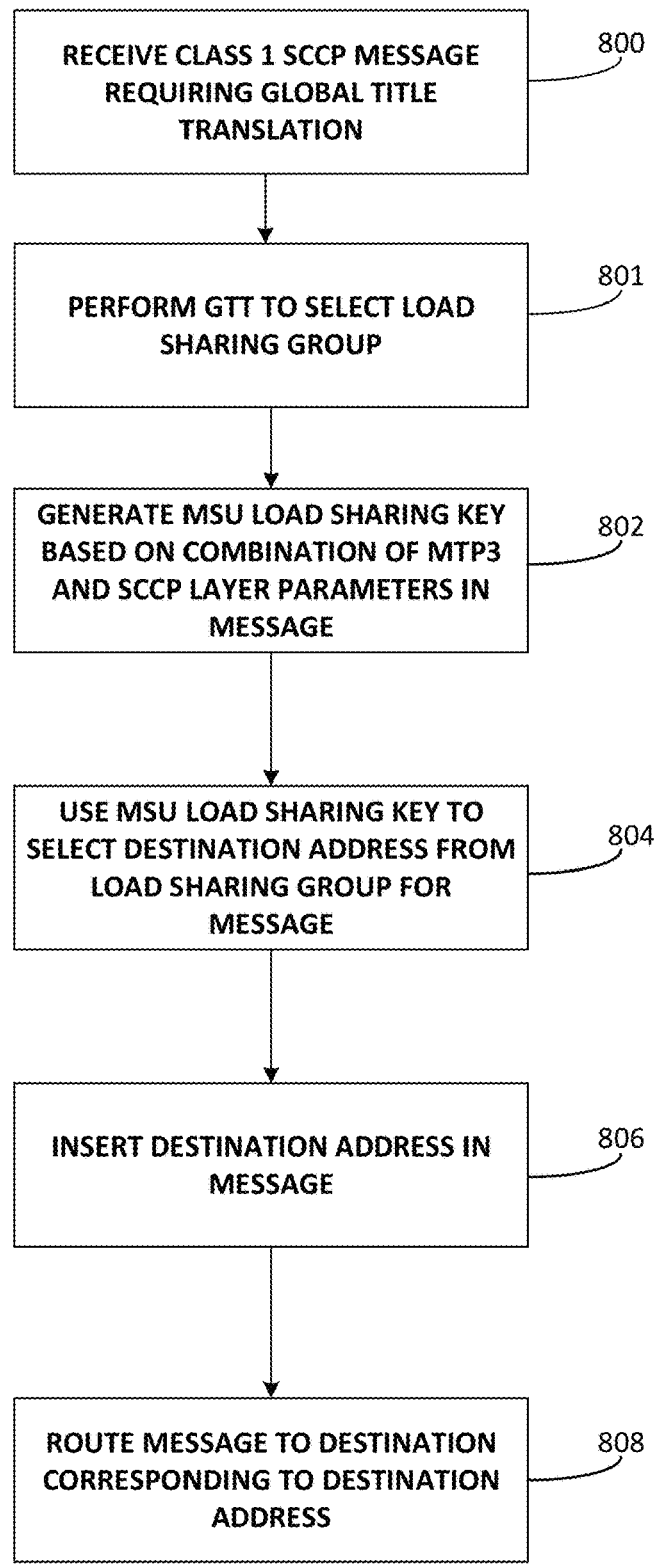
FIG. 8 is a flow chart illustrating an exemplary process for load sharing class 1 SCCP messages.

FIG. 8 is a flow chart illustrating exemplary steps for load sharing class 1 SCCP messages. Referring to FIG. 8, in step 800, the process includes receiving a class 1 SCCP message requiring global title translation. For example, STP 500 may receive a class 1 SCCP message for which the routing indicator indicates route on global title. The receiving message processor in STP 500 forwards the message to class 1 SCCP load sharing module 506.

In step 801, the process includes performing GTT for the message to select a load sharing group for the message. For example, load sharing module 506 may perform a lookup in a GTT table based on the CdGT digits and possibly other parameters in the message to identify a load sharing group. The load sharing group corresponds to a destination address array configured with addresses of nodes capable of processing the message.

In step 802, the process includes generating an MSU load sharing key from a combination of MTP3 layer parameters and signaling connection control part layer parameters in the message. For example, load sharing module 506 may compute the MSU load sharing key using either of Equations 2 and 4 above.

In step 804, the process includes using the MSU load sharing key to select a destination address for the message. For example, load sharing module 506 may perform a lookup in destination address array 706 for the load sharing group to determine the destination point code for the message.

In step 806, STP 500 inserts the destination address in the message. For example, load sharing module 506 may insert the DPC that matches the MSU load sharing key value in the destination point code field of the message.

In step 808, the process includes routing the message to the destination corresponding to the destination address. For example, routing module 508 may perform a lookup in an MTP3 routing table which maps destination point codes to linksets and route the class 1 SCCP message to the message processor associated with the outbound linkset corresponding to the destination point code value in the message.

Using the load sharing algorithms illustrated above by Equations 1-4, an STP can effectively load share messages between destination nodes while ensuring that messages relating to the same TCAP transaction are sent to the same destination node. It should be noted that the algorithms subscribed herein can be implemented on a physical STP product that is deployed on premises at a network operator's physical location or as a virtual STP product deployed in a cloud network.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for load sharing class 1 signaling connection control part (SCCP) messages, the method comprising:
receiving a class 1 SCCP message requiring global title translation (GTT);
performing global title translation (GTT) on the message to select a load sharing group for the message;
generating a message signal unit (MSU) load sharing key using parameters from a combination of message transfer part (MTP) layer parameters and signaling connection control part (SCCP) layer parameters, wherein generating the MSU load sharing key using the MTP layer parameters and the SCCP layer parameters includes generating the MSU load sharing key using a called party global title (CdGT), an originating point code (GPC), and a signaling link selector (SLS) from the message;
using the MSU load sharing key to select a destination address from the load sharing group for the message;
inserting the destination address into the message; and
routing the message to a destination corresponding to the destination address.

2. The method of claim 1 wherein receiving a class 1 SCCP message requiring GTT includes receiving the class 1 SCCP message at an SS7 signal transfer point (STP).

3. The method of claim 1 wherein receiving a class 1 SCCP message requiring GTT includes receiving the class 1 SCCP message from a mobile switching center (MSC).

4. The method of claim 1 wherein generating the MSU load sharing key using the CdGT, the OPC, and the SLS from the message includes generating the MSU load sharing key by using values derived from the CdGT, the OPC, and the SLS to perform lookups in arrays of pseudorandomly generated values and computing the MSU load sharing key from values obtained from the lookups.

5. The method of claim 4 wherein generating the MSU load sharing key generating the MSU load sharing key by using values derived from the CdGT, the OPC, and the SLS to perform lookups in arrays of pseudorandomly generated values and computing the MSU load sharing key from values obtained from the lookups includes generating the MSU load sharing key using the following equation:

$$MSUKEY=MOD(VLOOKUP(MOD(OPC, Max\_Dests),OPCArray)+VLOOKUP(SLS,SLS Array)+VLOOKUP(MOD(CdGT,Max\_Dests), OPCArray),Max\_Dests),$$

where MSUKEY is the MSU load sharing key, MOD is a modulo function, VLOOKUP is a lookup function that performs a lookup in an array, OPC is the OPC from the message, OPCArray is an array of pseudorandomly generated values, SLS is the SLS from the message, SLSArray is an array of pseudorandomly generated values, and CdGT is the called party global title from the message and Max_Dests is the maximum number of destinations for load sharing.

6. The method of claim 1 wherein generating the MSU load sharing key using the CdGT, the OPC, and the SLS includes generating the MSU load sharing key by computing a value from the CdGT and using the OPC and the SLS to perform lookups in arrays of pseudorandomly generated values.

7. The method of claim 6 wherein generating the MSU load sharing key using the CdGT, the OPC, and the SLS includes generating the MSU load sharing key by computing a value from the CdGT and using the OPC and the SLS to perform lookups in arrays of pseudorandomly generated values includes generating the MSU load sharing key using the following equation:

$$MSUKEY=MOD(VLOOKUP(MOD(OPC, Max\_Dests),OPCArray)+VLOOKUP(SLS,SLS Array)+MOD(CdGT,Max\_Dests),Max\_Dests),$$

where MSUKEY is the MSU load sharing key, MOD is a modulo function, VLOOKUP is a lookup function that performs a lookup in an array, OPC is the originating point code from the message, OPCArray is an array of psuedorandomly generated values, SLS is the signaling link selector from the message, SLSArray is an array of pseudorandomly generated values, and CdGT is the called party global title from the message.

8. The method of claim 1 wherein generating the MSU bad sharing key using MTP and SCCP parameters includes generating the same MSU bad sharing key for class 1 SCCP messages that are part of the same transaction capabilities application part (TCAP) transaction.

9. The method of claim 1 wherein routing the message to a destination corresponding to the destination address includes routing the message to a home location register (HLR).

10. A system for load sharing class 1 signaling connection control part (SCCP) messages, the system comprising:
an SSS signal transfer point (STP) including at least one processor and a memory;
a class 1 SCCP load sharing module implemented by the at least one processor for receiving a class 1 SCCP message requiring global title translation (GTT), performing GTT on the message to select a load sharing group for the message, generating a message signal unit (MSU) load sharing key using parameters from a combination of message transfer part (MTP) layer parameters and signaling connection control part (SCCP) layer parameters, using the MSU load sharing key to select a destination address from the load sharing group for the message, and inserting the destination address into the message, wherein the class 1 SCCP load sharing module is configured to generate the MSU load sharing key using a called party global title (CdGT), an originating point code (OPC), and a signaling link selector (SLS) from the message; and a routing module implemented by the at least one processor for routing the message to a destination corresponding to the destination address.

11. The system of claim 10 the class 1 SCCP message is from a mobile switching center (MSC).

12. The system of claim 10 wherein the class 1 SCCP load sharing module is configured to generate the MSU load sharing key by using values derived from the CdGT, the OPC, and the SLS to perform lookups in arrays of pseudorandomly generated values and compute the MSU load sharing key from values obtained from the lookups.

13. The system of claim 12 wherein the class 1 SCCP load sharing module is configured to generate the MSU load sharing key by using the following equation:

MSUKEY=MOD(VLOOKUP(MOD(OPC, Max_Dests),OPCArray)+VLOOKUP(SLS,SLS Array)+VLOOKUP(MOD(CdGT,Max_Dests), OPCArray),Max_Dests), where MSUKEY is the MSU load sharing key, MOD is a modulo function, VLOOKUP is a lookup function that performs a lookup in an array, OPC is the originating point code from the message, OPCArray is an array of pseudorandomly generated values, SLS is the signaling link selector from the message, SLSArray is an array of pseudorandomly generated values, and CdGT is the called party global title from the message and Max_Dests is the maximum number of destinations for load sharing.

14. The system of claim 10 wherein the class 1 SCCP load sharing module is configured to generate the MSU load sharing key by computing a value from the CdGT and using the OPC and the SLS to perform lookups in arrays of pseudorandomly generated values.

15. The system of claim 14 the class 1 SCCP load sharing module is configured to generate the MSU load sharing key using the following equation:

MSUKEY=(VLOOKUP(MOD(OPC,Max_Dests), OPCArray)+VLOOKUP(SLS,SLS Array)+MOD (CdGT,Max_Dests),Max_Dests), where MSUKEY is the MSU load sharing key, MOD is a modulo function, VLOOKUP is a lookup function that performs a lookup in an array, OPC is the originating point code from the message, OPCArray is an array of psuedorandomly generated values, SLS is the signaling link selector from the message, SLSArray is an array of pseudorandomly generated values, and CdGT is the called party global title from the message.

16. The system of claim 10 wherein the class 1 SCCP load sharing module is configured to generate the same MSU load sharing key for class 1 SCCP messages that are part of the same transaction capabilities application part (TCAP) transaction.

17. The system of claim 10 wherein the destination comprises a home location register (HLR).

18. A non-transitory computer readable medium having stored thereon executable instructions that when executed by a processor of a computer control the computer to perform steps comprising:

receiving a class 1 signaling connection control part (SCCP) message requiring global title translation (GTT);

performing GTT on the message to select a load sharing group for the message;

generating a message signal unit (MSU) load sharing key using parameters from a combination of message transfer part (MTP) layer parameters and signaling connection control part (SCCP) layer parameters, wherein generating the MSU load sharing key using the MTP layer parameters and the SCCP layer parameters includes generating the MSU load sharing key using a called party global title (CdGT), an originating point code (GPC), and a signaling link selector (SLS) from the message;

using the MSU load sharing key to select a destination address from the load sharing group for the message;

inserting the destination address into the message; and routing the message to a destination corresponding to the destination address.

* * * * *

UNITED STATES PATENT AND TRADEMARK OFFICE
CERTIFICATE OF CORRECTION

| | | |
|---|---|---|
| PATENT NO. | : 11,902,725 B2 | Page 1 of 2 |
| APPLICATION NO. | : 17/095400 | |
| DATED | : February 13, 2024 | |
| INVENTOR(S) | : Chaurasia et al. | |

It is certified that error appears in the above-identified patent and that said Letters Patent is hereby corrected as shown below:

On the Title Page

On page 2, Column 2 under Other Publications, Line 22, delete "Searchig" and insert -- Searching --, therefor.

In the Specification

In Column 3, Line 35, delete "GdGT" and insert -- CdGT --, therefor.

In Column 3, Lines 60-61, delete "psuedorandomly" and insert -- pseudorandomly --, therefor.

In Column 4, Line 45, delete "class" and insert -- class 1 --, therefor.

In Column 4, Line 47, delete "equation;" and insert -- equation: --, therefor.

In Column 4, Line 59, delete "GdGT" and insert -- CdGT --, therefor.

In Column 5, Lines 12-13, delete "psuedorandomly" and insert -- pseudorandomly --, therefor.

In Column 11, Line 26, delete "psuedorandomly" and insert -- pseudorandomly --, therefor.

In Column 12, Line 25, delete "psuedorandomly" and insert -- pseudorandomly --, therefor.

In the Claims

In Column 15, Line 50, in Claim 1, delete "(GPC)," and insert -- (OPC), --, therefor.

In Column 16, Line 12, in Claim 5, delete "(SL,SLS" and insert -- (SLS,SLS --, therefor.

Signed and Sealed this
Fourteenth Day of May, 2024

Katherine Kelly Vidal
*Director of the United States Patent and Trademark Office*

CERTIFICATE OF CORRECTION (continued)
U.S. Pat. No. 11,902,725 B2

In Column 16, Lines 43-44, in Claim 7, delete "psuedorandomly" and insert -- pseudorandomly --, therefor.

In Column 16, Line 49, in Claim 8, delete "bad" and insert -- load --, therefor.

In Column 16, Line 50, in Claim 8, delete "bad" and insert -- load --, therefor.

In Column 16, Line 59, in Claim 10, delete "SSS" and insert -- SS7 --, therefor.

In Column 18, Line 4, in Claim 15, delete "MSUKEY=(VLOOKUP" and insert -- MSUKEY=MOD(VLOOKUP --, therefor.

In Column 18, Line 10-11, in Claim 15, delete "psuedorandomly" and insert -- pseudorandomly --, therefor.

In Column 18, Line 37, in Claim 18, delete "(GPC)," and insert -- (OPC), --, therefor.